United States Patent [19]

Accordino

[11] Patent Number: 5,577,697
[45] Date of Patent: Nov. 26, 1996

[54] FLASHLIGHT ACCESSORY

[76] Inventor: Carmine L. Accordino, 15034 N. 53rd St., Scottsdale, Ariz. 85254

[21] Appl. No.: 532,245

[22] Filed: Sep. 22, 1995

[51] Int. Cl.[6] ............................................. A47G 1/17
[52] U.S. Cl. ................................... 248/206.5; 248/316.7
[58] Field of Search ............................. 248/206.5, 313, 248/316.7, 316.8, 229.16, 229.26; 211/89; 224/545, 553, 562

[56]  References Cited

U.S. PATENT DOCUMENTS

| | | | |
|---|---|---|---|
| 1,932,143 | 10/1933 | Piercy | 362/398 |
| 2,042,385 | 5/1936 | Boring | 362/396 |
| 2,247,131 | 6/1941 | Muldoon | 362/396 |
| 2,402,877 | 6/1946 | Dial | 362/396 |
| 2,524,173 | 10/1950 | Perterson | 248/229 |
| 2,585,292 | 2/1952 | Sears | 240/59 |
| 2,638,297 | 5/1953 | Weinberger | 363/396 |
| 3,069,539 | 12/1962 | Kidd | 248/316.7 |
| 4,506,317 | 3/1985 | Duddy | 362/396 |
| 4,727,462 | 2/1988 | Komonko | 248/206.5 |
| 4,848,714 | 7/1989 | Ziaylek, Jr. et al. | 248/313 |
| 4,907,769 | 3/1990 | Hunley, Jr. et al. | 248/185 |
| 4,938,440 | 7/1990 | Weinfield | 248/316.7 |
| 4,998,187 | 5/1991 | Herrick | 362/103 |

OTHER PUBLICATIONS

Flashmnate™ flyer dated 1991.

*Primary Examiner*—Leslie A. Braun
*Assistant Examiner*—Willie Berry, Jr.
*Attorney, Agent, or Firm*—Frank J. McGue

[57]  ABSTRACT

A flashlight accessory is disclosed which comprises a connector bar having two clamps rotatably mounted at each end of the bar. Lastly, a magnet is mounted on the connector bar between the respective clamps. The preferred clamps are "Y" shaped with the lower extension being received in an open ended slot cut in each end of the connector bar. A screw extends through holes on either side of the slot and through a corresponding hole in the lower extension. Tightening the wingnut firmly secures the clamp in the desired position. The upwardly extending arms of each clamp are arcuate in shape and flexible enough to allow insertion of a standard flashlight but resilient enough to firmly grasp the flashlight when inserted therebetween. One or both clamps may be used to secure the flashlight.

7 Claims, 2 Drawing Sheets

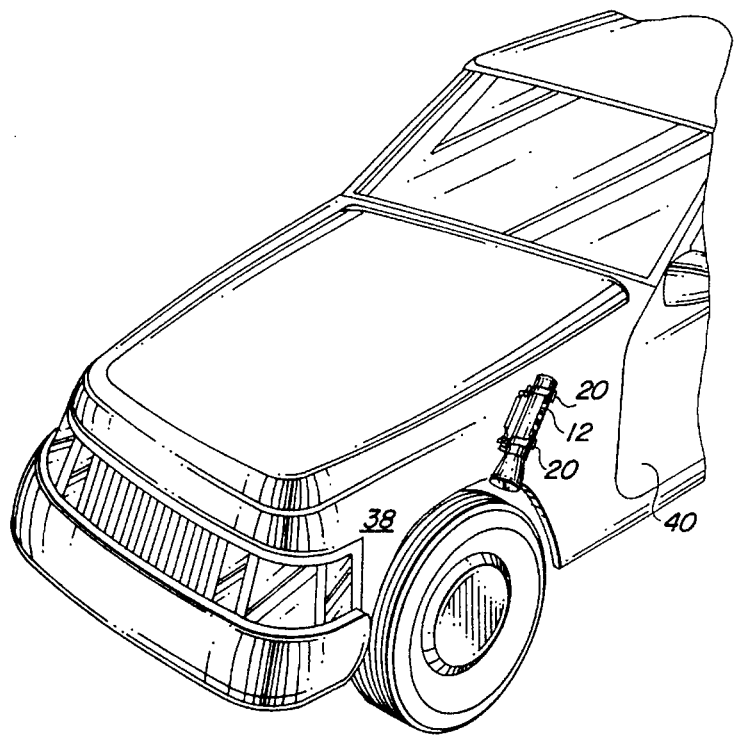
FIG. 4
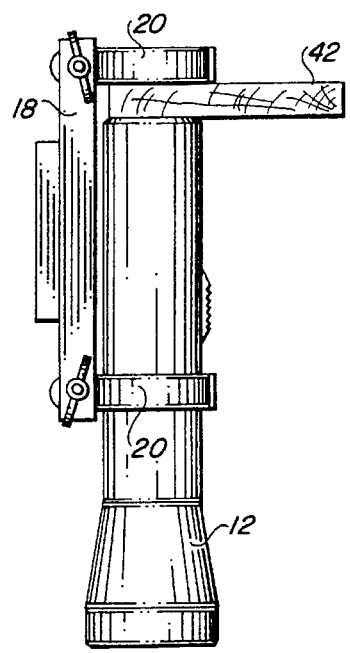
FIG. 5
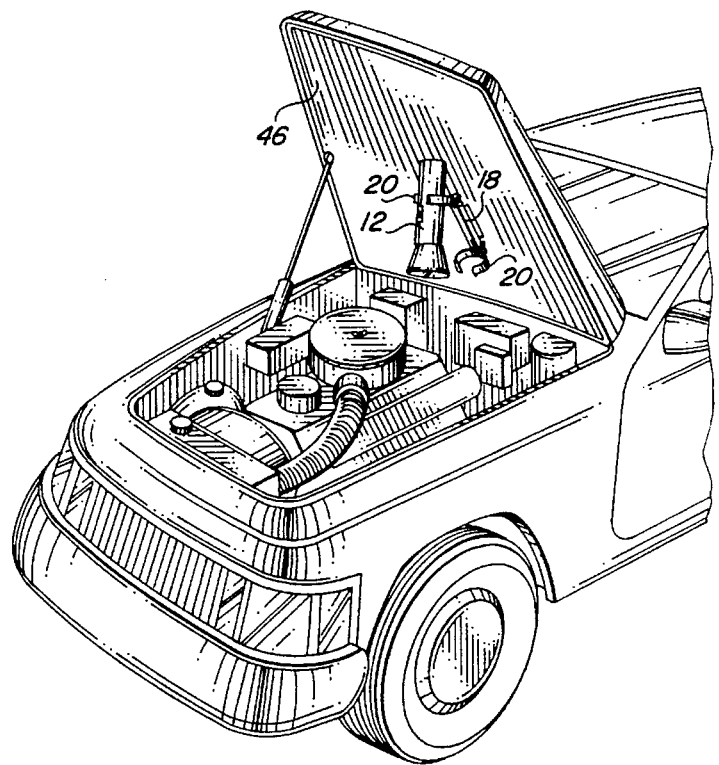
FIG. 6
FIG. 7

5,577,697

FLASHLIGHT ACCESSORY

TECHNICAL FIELD

This invention relates to flashlight accessories, and, more particularly, to an accessory which mounts a standard flashlight on a variety of surfaces and allows a user to direct the light therefrom as desired.

BACKGROUND OF THE INVENTION

Various types of flashlight accessories have been described in the patent literature.

U.S. Pat. No. 4,938,440 entitled "Rotatable Flashlight Holder" which issued Jul. 3, 1990 to Weinfield shows a portable, rotatable holder for a flashlight comprises a base structure, an upright housing secured thereto, a receptacle for receiving and releasably holding a flashlight and means for dual rotational movement of the clamped flashlight to a desired position.

U.S. Pat. No. 2,042,385 entitled "Flashlight Attachment for Gasoline Hose Nozzles" which issued on May 26, 1936 to Boring discloses a means for attaching a flashlight to a gasoline nozzle including split clamps connected by frictional pivot links to an elongated strip.

U.S. Pat. No. 4,907,769 entitled "Flashlight Holder" which issued on Mar. 13, 1990 to Hunley Jr. et al. discloses a flashlight holder in a C-shaped configuration having an arm which fits into a bracket and is held at the desired angle by a screw and a nut which is not shown. Magnets may secure the holder to a car, truck or the like.

U.S. Pat. No. 1,932,143 entitled "Permanent Magnet Support for Lamps" which issued on Oct. 24, 1933 to Piercy shows a lamp supported by a clamping member which is held at the desired angle by a thumbscrew fastener. The clamping members are connected to a magnetic base as shown in FIG. 3.

U.S. Pat. No. 2,402,877 entitled "Adjustable Flashlight Holder" which issued Jun. 25, 1946 to Dial shows a springy clamping clip for clamping a flashlight. A binding member adjustably holds the clamping member at the desired angle.

U.S. Pat. No. 2,638,297 entitled "Article Holder" which issued on May 12, 1953 to Weinberger discloses an article holder which has a resilient gripping clip which may grip a flashlight. Spring blades also engage the lower part of the flashlight and may be rotated to form a supporting base as shown in FIG. 9.

None of the known prior art disclose the device set forth herein.

SUMMARY OF THE INVENTION

It is an object of this invention to provide an improved flashlight accessory characterized by the dual ability to be mounted on a variety of surfaces and simultaneously direct light in a desired direction.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 4 is a side view of the device of FIG. 1 being mounted on the fender of an automobile;

FIG. 5 is a side view of the device of FIG. 1 being mounted to a shelf:

FIG. 6 is a side view of the device of FIG. 1 standing on a flat surface; and

FIG. 7 is a side view of the device of FIG. 1 being mounted on the underside of the hood of an automobile.

DESCRIPTION OF THE PREFERRED EMBODIMENT

Figure 1:
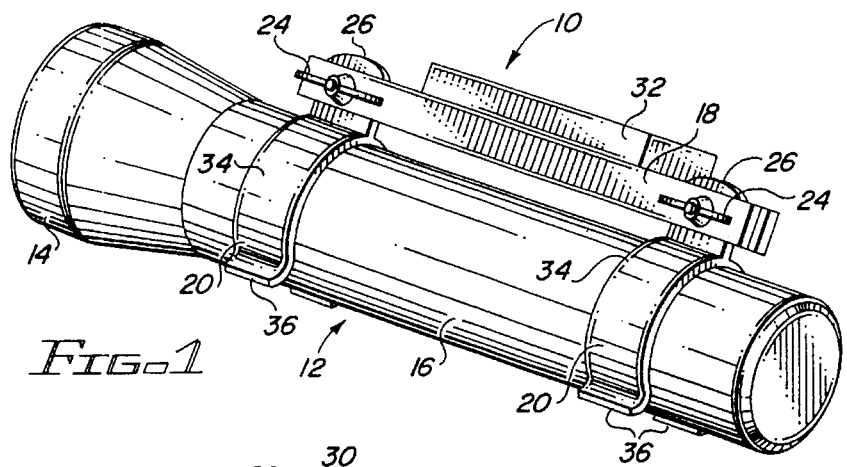
FIG. 1 is a perspective view of the present invention holding a flashlight.
Figure 2:
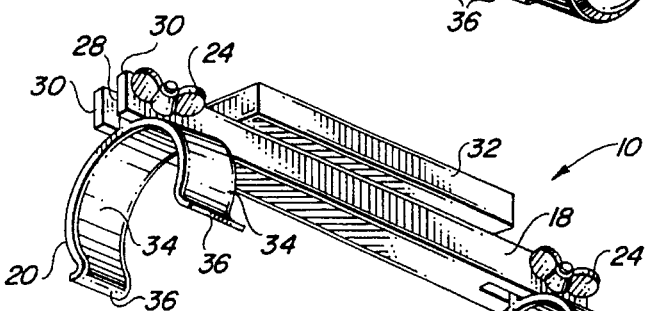
FIG. 2 is a perspective view of the device depicted in FIG. 1 without the flashlight.
Figure 3:
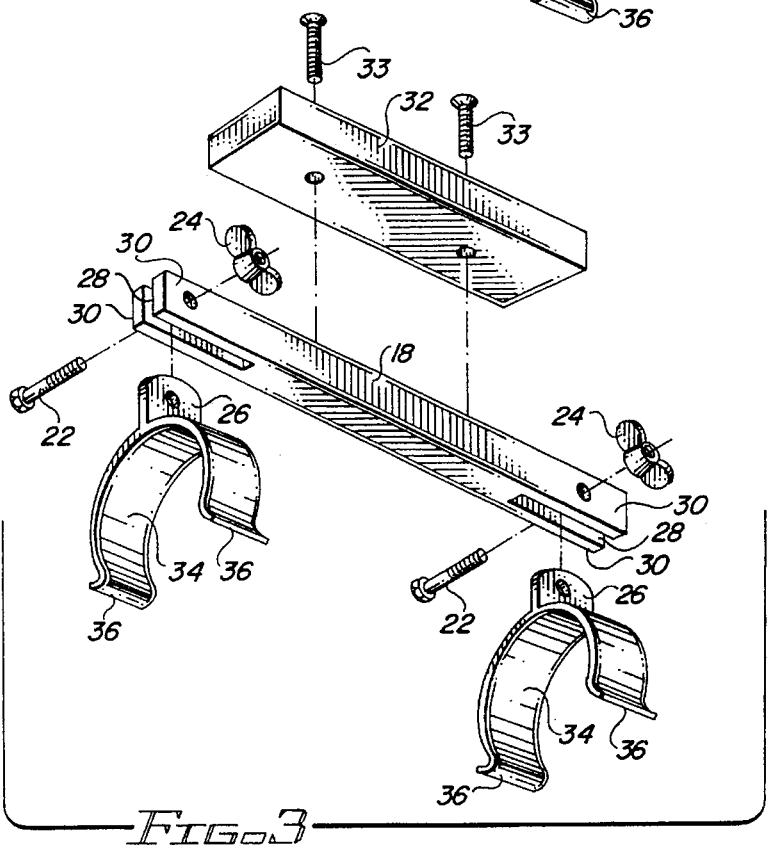
FIG. 3 is an exploded perspective view of the device depicted in FIG. 2.

Referring more particularly to the drawings by characters of reference, FIGS. 1–3 disclose a flashlight accessory 10 for use in connection with a flashlight 12. It should be understood that while the present discussion relates to flashlight 12 having the illustrated configuration, the principles of the invention are equally applicable to other flashlight configurations.

As best seen in FIG. 1, flashlight 12 has a lamp portion 14 and a cylindrical battery storage portion 16 which holds standard cylindrically shaped batteries (not shown) for use.

As best seen in FIGS. 2 and 3, flashlight accessory 10 comprises a connector bar 18 having two clamps 20 rotatably mounted at each end of bar 18. In the presently preferred embodiment, connector bar 18 is four inches (4") long with a half-inch (½") square profile. Connector bar 18 is preferably manufactured from injection molded ABS.

The preferred clamps 20 are generally "Y" shaped with the lower extensions 26 being received between arms 30 of connector bar 18 which form open ended slots 28 extending completely through each end of connector bar 18. In the preferred embodiment, slots 28 are one eighth inch (⅛") wide and three quarters (¾") long.

In the presently preferred embodiment, clamps 20 are also manufactured from injection molded ABS. ABS is preferred for connector bar 18 and clamps 20 as it provides the needed combination of rigidity and resiliency for use as described below. Those skilled in the art will recognize that other materials could be employed to accomplish the same purpose.

Although any standard fastening means would be suitable, it is presently preferred that machine screws 22 extend through corresponding holes in arms 30 and in lower extensions 26 and are secured by wingnuts 24. Lower extensions 26, and hence clamp 20, can be easily rotated as desired before tightening wingnuts 24. Once the desired angular position is reached for each clamp 20 separately, the corresponding wingnut 24 is tightened which firmly secures lower extension 26, and hence clamp 20, between arms 30. As noted above, the presently preferred embodiment of connector bar 18 is made of ABS which provides the needed resiliency for arms 30 to operatively engage lower extension 26 in the desired position.

Further, a magnet 32 is mounted on connector bar 18, preferably at its midpoint. In the preferred embodiment, magnet 32 is one and thirteen-sixteenths (1 13/16") long, three-eighths inch (⅜") thick and thirteen-sixteenths inch (13/16") wide. Two sheet metal screws 33 secure magnet 32 to connector bar 18.

Upwardly extending opposing arms 34 of each clamp 20 are arcuate in shape and flexible to allow insertion of flashlight 10 but rigid and wide enough to firmly grasp flashlight 10 when inserted therebetween. In the preferred embodiment, arms 34 form a one and three-eighths inch diameter, 270 degree circular arc which opens upwardly opposite lower extension 26. Thumb rests 36 extend radially from the open ends of arms 34. A user pressing downwardly on rests 36 manually separates arms 34 to allow removal and insertion of flashlight 12.

In addition, arms 34 are wide enough and resilient enough such that only one clamp 20 is needed to firmly secure flashlight 10. In the preferred embodiment, arms 34 are three-quarter inch (¾") wide. As noted previously, injection molded ABS is preferably used to provide the needed resiliency.

Some examples of the device in use are shown in FIGS. 4–7. In FIG. 4, both clamps 20 are used to secure flashlight 12 parallel to connector bar 18. Magnet 32 adheres to a fender 38 of an automobile 40 whereby the light from flashlight 12 shines downwardly therefrom. This use is helpful when attempting to change a tire in darkness.

In FIG. 5, only one clamp 20 is used to secure flashlight 12 parallel to connector bar 18. However, the other clamp 20 is also secured to extend laterally from connector bar 18 on the same side as flashlight 12. A shelf 42 is captured between the free clamp 20 and the rear of flashlight 12. This configuration is useful to provide lighting from such a shelf to perhaps a workbench located below.

In FIG. 6, again only one clamp 20 is used to secure flashlight 12 parallel to connector bar 18. However, the other clamp 20 is secured to extend at an angle (60 degrees is depicted herein) laterally from connector bar 18 opposite from flashlight 12. The free clamp 20 acts as a base for resting accessory 10 on a flat surface 44 thereby allowing the flashlight to shine upwardly therefrom.

in FIG. 7, magnet 32 is used to secure accessory 10 to the underside of an automobile hood 46. Again, only one clamp 20 is used to secure flashlight 12. However, in this configuration, that clamp 20 is rotated to where flashlight 12 extends straight downward from hood 46 to provide illumination to the engine compartment. The other clamp 20 is unused in this configuration.

Although only certain embodiments have been illustrated and described, it will be apparent to those skilled in the art that various changes and modifications may be made therein without departing from the spirit of the invention or from the scope of the appended claims.

What is claimed is:

1. An accessory for use in combination with a flashlight having a lamp portion and a battery storage portion, the accessory comprising:

a connector bar having two arms at each end, the arms defining a slot therebetween, two Y-shaped clamps being independently rotatably mounted at each end of said connector bar, the lower extension of each of the Y-shaped clamps being rotatably mounted in the slot between the arms, the upwardly extending arms of each Y-shaped clamp adapted for firmly and removably securing the battery storage portion of the flashlight therebetween, the two clamps being positioned whereby both clamps can simultaneously engage the battery storage portion;

means for separately fastening each clamp independently at a desired angle extending laterally from opposing ends of said connector bar thereby allowing one of the Y-shaped clamps to extend above said connector bar to direct a flashlight mounted thereon as desired and the other of the Y-shaped clamps to extend below said connector bar to mount the accessory to a surface as desired; and a magnet mounted on the connector bar between the respective clamps.

2. The accessory of claim 1 wherein means for fastening comprises two machine screws and two wingnuts at each end of the connector bar, the machine screws extending through corresponding holes in the arms and in the respective lower extension, the machine screws being secured by the wingnuts.

3. The accessory of claim 1 wherein upwardly extending arms of each clamp are arcuate in shape.

4. The accessory of claim 3 wherein the arms of one clamp form a 270 degree circular arc having an opening opposite the lower extension.

5. The accessory of claim 4 wherein the circular arc has a diameter of one and three-eighths inches.

6. The accessory of claim 3 further comprising thumb rests extending radially from the open ends of the arms.

7. The accessory of claim 1 wherein the clamps and the connector bar are manufactured from injection molded ABS.

* * * * *